US005857066A

United States Patent [19]
Wyche et al.

[11] Patent Number: 5,857,066
[45] Date of Patent: Jan. 5, 1999

[54] METHOD AND SYSTEM FOR PRODUCING AN IMPROVED HIKING TRAIL MAP

[75] Inventors: C. Thomas Wyche, Greenville; James B. Conlon, Taylors, both of S.C.

[73] Assignee: Naturaland Trust, Greenville, S.C.

[21] Appl. No.: 367,094

[22] Filed: Dec. 30, 1994

[51] Int. Cl.$^6$ .................................................. G09B 29/10
[52] U.S. Cl. ............................................ 395/119; 434/150
[58] Field of Search ........................... 395/119–120, 127, 395/130; 434/150–153; 340/995

[56] References Cited

U.S. PATENT DOCUMENTS

| | | | |
|---|---|---|---|
| 3,729,315 | 4/1973 | Conklin et al. | 99/27 |
| 4,672,559 | 6/1987 | Jansson et al. | 364/525 |
| 4,682,160 | 7/1987 | Beckwith, Jr. et al. | 340/729 |
| 4,715,005 | 12/1987 | Heartz | 364/521 |
| 4,940,972 | 7/1990 | Mouchot et al. | 340/747 |
| 4,940,987 | 7/1990 | Frederick | 342/26 |
| 4,952,922 | 8/1990 | Griffin et al. | 340/729 |
| 4,956,706 | 9/1990 | Ohba | 358/93 |
| 4,957,310 | 9/1990 | Bissonnette | 283/34 |
| 4,963,865 | 10/1990 | Ichikawa et al. | 340/995 |
| 4,970,666 | 11/1990 | Welsh et al. | 395/123 |
| 5,067,098 | 11/1991 | Moellering et al. | 395/126 |
| 5,073,819 | 12/1991 | Gates et al. | 358/107 |
| 5,175,601 | 12/1992 | Fitts | 356/376 |
| 5,175,806 | 12/1992 | Muskovitz et al. | 395/125 |
| 5,179,638 | 1/1993 | Dawson et al. | 395/125 |
| 5,185,808 | 2/1993 | Cok | 382/1 |
| 5,226,109 | 7/1993 | Dawson et al. | 395/120 |
| 5,255,352 | 10/1993 | Falk | 395/125 |
| 5,257,346 | 10/1993 | Hanson | 395/119 |
| 5,257,347 | 10/1993 | Busbridge et al. | 395/129 |
| 5,268,994 | 12/1993 | Keskes | 395/121 |
| 5,282,140 | 1/1994 | Tazawa et al. | 15/45 |
| 5,379,215 | 1/1995 | Kruhoeffer et al. | 364/420 |
| 5,402,340 | 3/1995 | White et al. | 364/420 |
| 5,413,349 | 5/1995 | Canther | 273/245 |
| 5,517,419 | 5/1996 | Lanckton et al. | 364/449 |

OTHER PUBLICATIONS

Lukatela, Hrvoje and Russell, John, "Spatial data and the Voronoi tessellation: unrestricted modeling and efficient manipulation of terrestrial objects", *Dr. Dobb's Journal* Dec. 1992 v17 n12 p. 18(9).

Mahoney, Diana Phillips, "Viewing Venus in stereo; researchers transform two–dimensional data into three–dimensional maps", (research at NASA's Jet Propulsion Laboratory) Mahoney, *Computer Graphics World*, v16, n1, p. 77(2), Jan. 1993.

MacNicol, Gregory, "Complex Imagery", (Imaging) (the future of image processing) (column), *Computer Graphics World*, v14, n9, p. 75(4), Sep. 1991.

Lang, Laur, "GIS goes 3d", (geographic information system—three–dimensional), *Computer Graphics World*, v12, n3, p. 38(6), Mar. 1989.

McMillan, Thomas M., "Graphics for the task; the Analytic Sciences Corp. sharpens the vision of technology", (scientific visualization) (company profile), *Computer Graphics World*, v11, n8, p. 69(3), Aug. 1988.

(List continued on next page.)

*Primary Examiner*—Mark K. Zimmerman
*Assistant Examiner*—Rudolph Buchel
*Attorney, Agent, or Firm*—Dority & Manning

[57] ABSTRACT

A method and system of producing a 3D perspective representation of a hiking trail or the like in two dimensions. Manually-obtained first data indicative of a heading and distance of each approximately linear segment of the course of travel are correlated with second data indicative of a topography of an underlying geographical region. A representation of the course of travel as viewed from perspective may then be selectively produced utilizing the correlated data. Linear segments of the course of travel are shown in this view situated at a relative angle with respect to adjacent linear segments, the angle representative of a direction and slope thereof. As a result, changes in elevation of the course of travel are continuously shown on the perspective two-dimensional representation to facilitate visual appreciation of the difficulty thereof by the traveller.

4 Claims, 5 Drawing Sheets

OTHER PUBLICATIONS

Fenton, Erfert, "Scenery Animator1.0.4", (Natural Graphics' landscape rendering and animation software), *Macworld* Aug. 1994 v11 n8 p.l 79(1).

Said, Carolyn, "Photoshop plug–ins shape terrain, import EPS files", (Knoll Software Cybermesh; Total Integration Epilogue)(Brief Article), *MacWEEK* Jul. 11, 1994 v8 n28 p. 18(2).

Bain, G. Donald, "Map II 1.5: application provides tools for mapping and analysis", (ThinkSpace Inc.'s mapping software package), *MacWEEK* Jun. 28 1993 v7 n26 p. 76(1).

McClelland, Deke, "The other presenters: budget & technical software", *PC World* Nov 1992 v10 n11 p. 233(4).

Kweon, In So, et al,"High Resolution Terrain Map from Multiple Sensor Data", *Intelligent Robots and Systems*, 1990 Workshop, pp. 127–134.

Herbert, M. *et al*,"Terrain Mapping for a Roving Planetary Explorer", *Robotics and Automation, 1989 IEEE International Conference*, pp. 997–1002.

Krotkov, Eric, et al, "Terrain Mapping for a Walking Planetary Rover", IEEE Journal on Robotics and Automation, vol. 10, Iss6, Dec. 1994, pp. 828–839.

| NAME OF TRAIL: | NATURE LAND TRUST TRAIL | |
|---|---|---|
| TRAIL SEGMENT | HEADING | DISTANCE |
| 1 | | |
| 2 | | |
| 3 | | |
| 4 | | |
| 5 | | |
| 6 | | |
| 7 | | |
| 8 | | |
| 9 | | |
| 10 | | |
| 11 | | |

METHOD AND SYSTEM FOR PRODUCING AN IMPROVED HIKING TRAIL MAP

BACKGROUND OF THE INVENTION

The present invention relates to trail maps of the type utilized by hikers. More particularly, the present invention relates to improvements in such trail maps, as well as a method and system for producing same.

Avid hikers often purchase trail books which textually describe the terrain of various trails in a given area. Further, these trail books generally include a fold-out topographical map on which the trails are plotted and identified by number. The topographical map shows a plan view of the region, with differences in elevation shown by "topo lines."

Such prior art trail maps have often been of limited utility to many hikers. Particularly, less experienced hikers frequently have difficulty judging the steepness of the various segments of a particular trail when using this type of map. A hiker inadvertently misreading such a map may choose to hike a trail which is not of the desirable level of difficulty for that hiker. As these trails are often several miles in length, a hiker in this situation may find it simply easier to continue on an undesired, more difficult trail than to attempt finding another trail. On the other hand, hikers desiring a challenging hike can easily select a steep, more arduous trail.

Ski trail maps have been produced which show various ski runs as viewed from perspective. Here, an oblique aerial photo of a snow-covered mountain shows a cleared "swath" which is the ski run. Apparently, an artist sketches in the outside perimeters of each run. Since the ski runs are generally defined already by the clearing of such run, it is a relatively easy task to outline the "swath" on the photograph. As will be appreciated, such a technique would not be suitable to produce a map of a hiking trail with numerous turns or switchbacks or other narrow and obscure course of travel. Furthermore, these maps do not purport to show relative elevation along a specific course of travel except as it is perceived by the outline of the mountain itself. Further, such method of oblique aerial photography would not depict such hiking trails in a three dimensional (3D) perspective or virtual reality.

SUMMARY OF THE INVENTION

The present invention recognizes and addresses the foregoing disadvantages, and others, of prior art constructions and methods.

Accordingly, it is an object of the present invention to provide an improved trail map which facilitates a visual appreciation by a hiker of the steepness and relative difficulty of a particular trail.

It is a more particular object of the present invention to provide a hiking trail map which shows not only the horizontal path of a hiking trail, but also the continuous changes in elevation of such trail from its beginning to end represented in a 3D perspective or virtual image.

It is a further object of the present invention to provide a method of producing such a trail map.

It is a further object of the present invention to provide a system for producing such a trail map.

Some of these objects are achieved by a method of producing a 3D perspective representation of a course of travel, such as a hiking trail or the like in two dimensions. The method comprises providing manually-obtained first data indicative of a heading and distance of each approximately linear segment of the course of travel. Second data are also provided which are indicative of a topography of a geographical region underlying the course of travel, as represented from plan. The first data and the second data are then correlated to produce third data indicative of the approximately linear segments of the course of travel as overlying the geographical area. Next, a 3D representation in two dimensions of the course of travel from perspective is selectively produced utilizing the third data. Linear segments of the course of travel are shown in this view situated at a relative angle with respect to adjacent linear segments, the angle representative of a direction and slope thereof. As a result, changes in elevation of the course of travel are continuously shown to facilitate visual appreciation with 3D or virtual perspective of the difficulty thereof by the traveller. Preferably, the "perspective" view of the 3D representation is modified such that parallel features do not converge at a "vanishing" point, but remain parallel.

In some exemplary methods, a plan-view topographical map of the geographical area underlying the course of travel is provided. This topographical map is then digitally scanned into a raster format image. Next, topo lines on the raster format image are preserved. Relative elevations are then assigned to respective of the topo lines to produce a vector format image. Preferably, a wire frame mesh image is then produced from the vector format image. The first data may be "draped" onto the wire frame mesh image to correlate it with the second data.

In order to ensure accuracy, the first data is preferably provided by travelling along each of the approximately linear segments of the course of travel, such as a particular hiking trail, and recording information indicative of the heading and distance thereof. Such data may be directly recorded utilizing appropriate recording instruments. For example, a compass may be utilized to manually determine the heading of each segment, whereas a measuring wheel may be utilized to determine the distance of each segment.

Other objects of the invention are provided by a system for producing a 3D representation in two dimensions as described above. Such a system comprises first input means for receiving manually-obtained first data indicative of a heading and distance of each approximately linear segment of the course of travel. Second input means are also provided for receiving second data indicative of the topography of the geographical area underlying the course of travel, as represented from plan.

The system further includes processor means in electrical communication with the first and second input means. The processor means perform several functions, including correlating the first data and the second data to produce third data indicative of the approximately linear segments of the course of travel as overlying the geographical area. Further, the processor means produce from the third data a 3D representation of the course of travel in two dimensions, showing the linear segments situated at a relative angle with respect to adjacent segments, the relative angle representative of a relative slope and direction thereof. Display means are also provided in electrical communication with the processor means for producing a 3-D representation from perspective in a visually perceptible form.

In presently preferred embodiments, the second input means comprises a digital scanner operative to scan a plan-view topographical map of the geographical area underlying the course of travel into a raster format image. The processor means may further operate to produce a wire frame mesh image from the second data and thereafter drape the second data onto the wire frame mesh image. A printer device may be provided for printing a physical map of the two-dimensional image on a sheet-like substrate, such as paper.

Other objects, features, and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
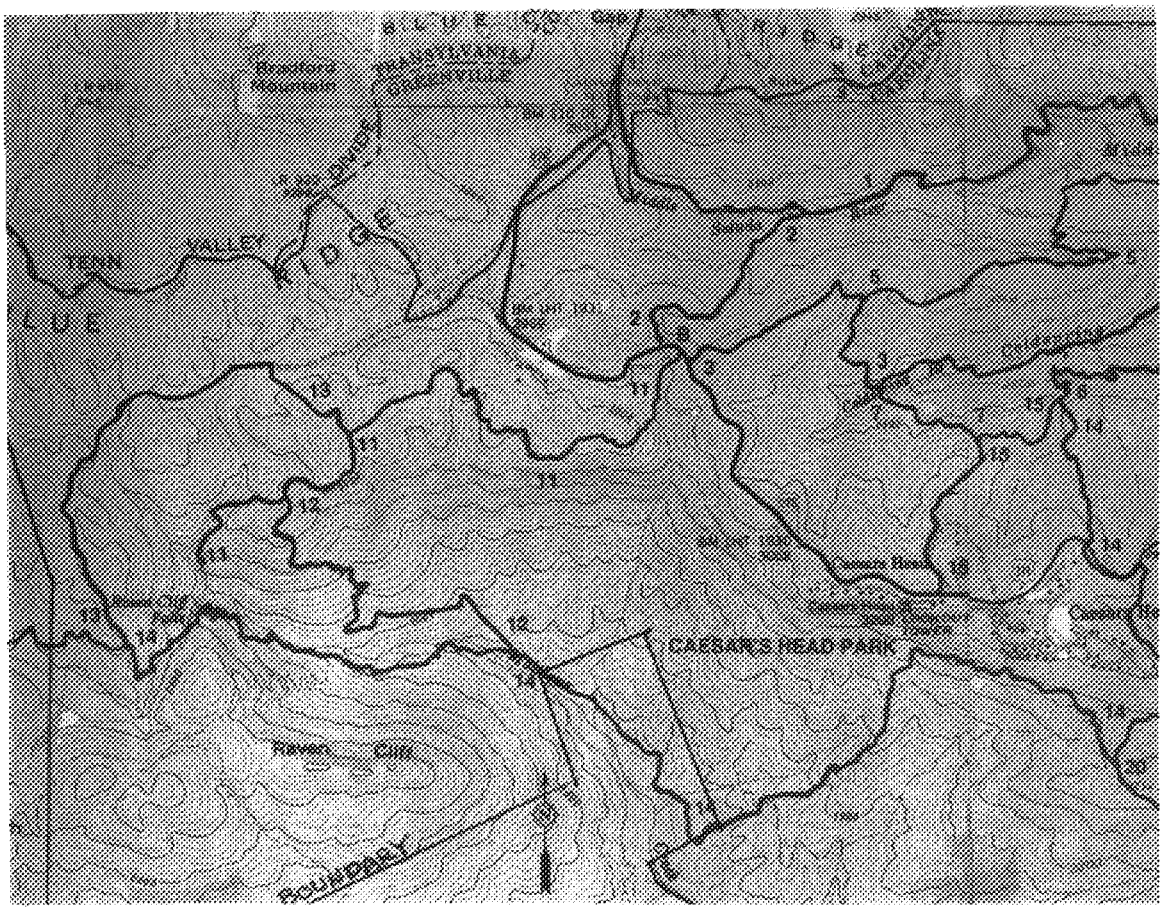
FIG. 1 is a representation of a trail map such as has been provided in the prior art.

The file of this patent contains at least one drawing executed in color: Copies of this patent with color drawing (s) will be provided by the Patent and Trademark Office upon request and payment of the necessary fee.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only and is not intended as limiting the broader aspects of the present invention, which broader aspects are embodied in the exemplary constructions.

FIG. 1 illustrates a typical trail map as has been produced according to the prior art. As an example, this particular trail map shows a portion of Caesar's Head State Park in South Carolina. As can be seen, the various trails, which are individually numbered, are shown from plan on a topographical map of the underlying region. As is typical for such topographical maps, changes in elevation are represented by the relative spacing between adjacent "topo lines." Particularly, each topo line represents a predetermined change in elevation from adjacent topo lines. Thus, sharp changes in elevation are shown by a narrow spacing between adjacent topo lines. More gradual changes in elevation are shown by a greater spacing between adjacent topo lines.

It can be seen that this map does not facilitate immediate visual appreciation of the relative difficulty of each trail. Instead, a hiker contemplating a particular trail must determine the difficulty of the trail by carefully analyzing the spacing between adjacent topo lines and, at the same time, comprehending how quickly or slowly the hiking trail reaches or "climbs" to higher elevations, or descends, as the case may be. Often, this will be an extremely difficult task, particularly for novice hikers. As a result, such a hiker may mistakenly proceed along a trail which is either easier or more difficult than desired. This hiker may not realize the mistake until well into the hike. As a result, the hiker is left to decide whether to backtrack, or to simply continue proceeding along the undesired trail.

Figure 2:
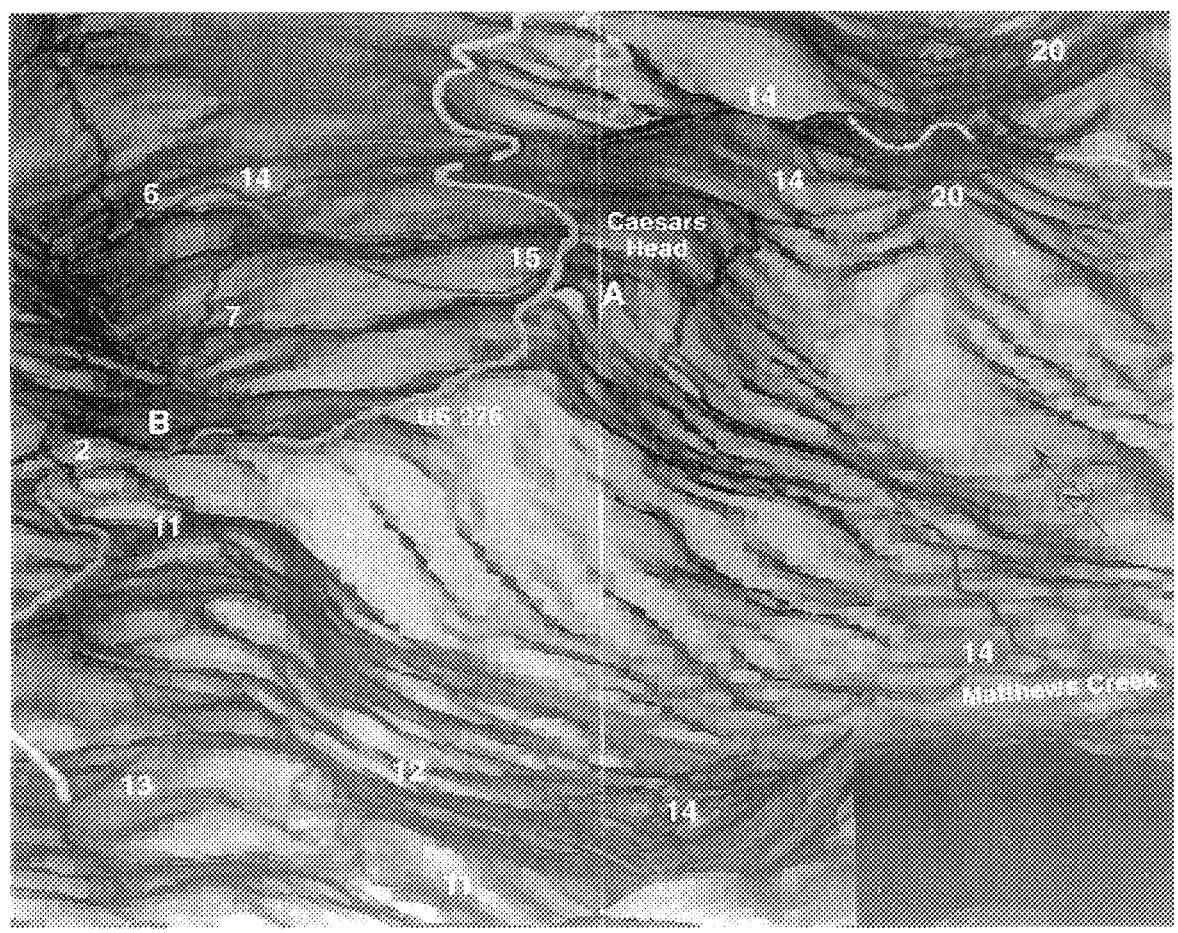
FIG. 2 is a representation of a trail map produced according to the present invention.

FIG. 2, on the other hand, illustrates a trail map such as may be produced according to the present invention. For ease of comparison, it can be seen that the trail map of FIG. 2 shows approximately the same geographical area as the prior art map of FIG. 1. Instead of viewed from plan, however, the individual trails in the map of FIG. 2 are viewed in a 3D representation produced in two dimensions. In other words, the trails, as well as the underlying terrain, are shown approximately as would be seen by an actual observer viewing from perspective. It can be seen that the steepness and relative difficulty of each trail may be appreciated more readily than the same trails as shown in the map of FIG. 1.

Unlike a typical perspective view, the "perspective" view of the present invention does not converge to a "vanishing" point beyond the map. Instead, the oblique scale remains substantially parallel throughout. This feature prevents trails which would otherwise be "crunched" at the entreme of the perspective to appear in full detail.

For example, consider the trail identified as trail 11. It can be seen in the maps of FIGS. 1 and 2 that this trail begins at the highway identified as U.S. 276 and near the parking area identified by the large "B." As shown most clearly in the map of FIG. 2, this trail proceeds on a crest in an approximately southeasterly direction until reaching an intersection with trails 12 and 13. From this point, trail 12 proceeds in an approximately southeasterly direction into a valley traversed by Matthews Creek. Trail 12 merges at this location with trail 14 and proceeds therealong in an approximately easterly direction.

After proceeding along Matthews Creek, trail 14 turns sharply north and proceeds through elevational changes of moderate difficulty until again turning to an approximately easterly direction. Next, trail 14 intersects trail 20 and sharply turns at this location to an approximately northerly direction. It can be seen that trail 14 then dips slightly behind a ridge before proceeding substantially westerly back to U.S. 276.

After crossing U.S. 276, trail 14 proceeds to a point of intersection with trail 15, which itself proceeds approximately southerly to a point of intersection with trail 7. From this location, the hiker may then proceed back to the starting location at U.S. 276 near the parking area B.

Comparing the representation of this trail in the respective maps of FIGS. 1 and 2, it can be seen that the map of FIG. 2 would be of greater utility to a hiker wishing to quickly appreciate the difficulty of such a trail. This enhanced visual appreciation occurs because the map clearly shows continuous changes in elevation and steepness of the various trails from beginning to end. Prior art trail maps such as that shown in FIG. 1 permit only the horizontal path of the trail to be readily appreciated.

Figure 2A:
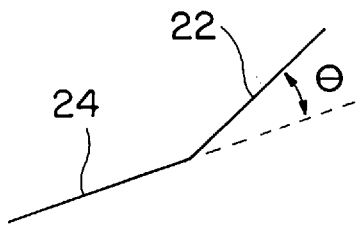

Although difficult to immediately realize due to the reduced scale of the map after finally produced, individual segments of each trail are shown at an angle with respect to adjacent segments. The angle is representative of the direction and relative slope of such segment with respect to the adjacent segment. For example, FIG. 2A illustrates a segment 22 situated at an angle with respect to segment 24. When all segments of a trail are shown in this manner, the hiker is given the desired virtual image.

The production of such a trail map involves a novel system and method according to the present invention.

These aspects of the invention will now be described with reference to FIGS. 3 through 6.

An important step in producing a trail map of the invention is to gather information indicative of the relative heading and distance of the individual segments of the trail. Such information could theoretically be obtained from aerial photographs of the area if the course of travel were discernible. In very rare situations, this technique may be utilized to obtain the courses and distances of some trails according to the invention. It is often impossible, however, to see a hiking trail from the air because it may be hidden by trees or simply too obscure or not visible, for example, where the trail traverses rocky or dry areas.

Figures 3, 4:
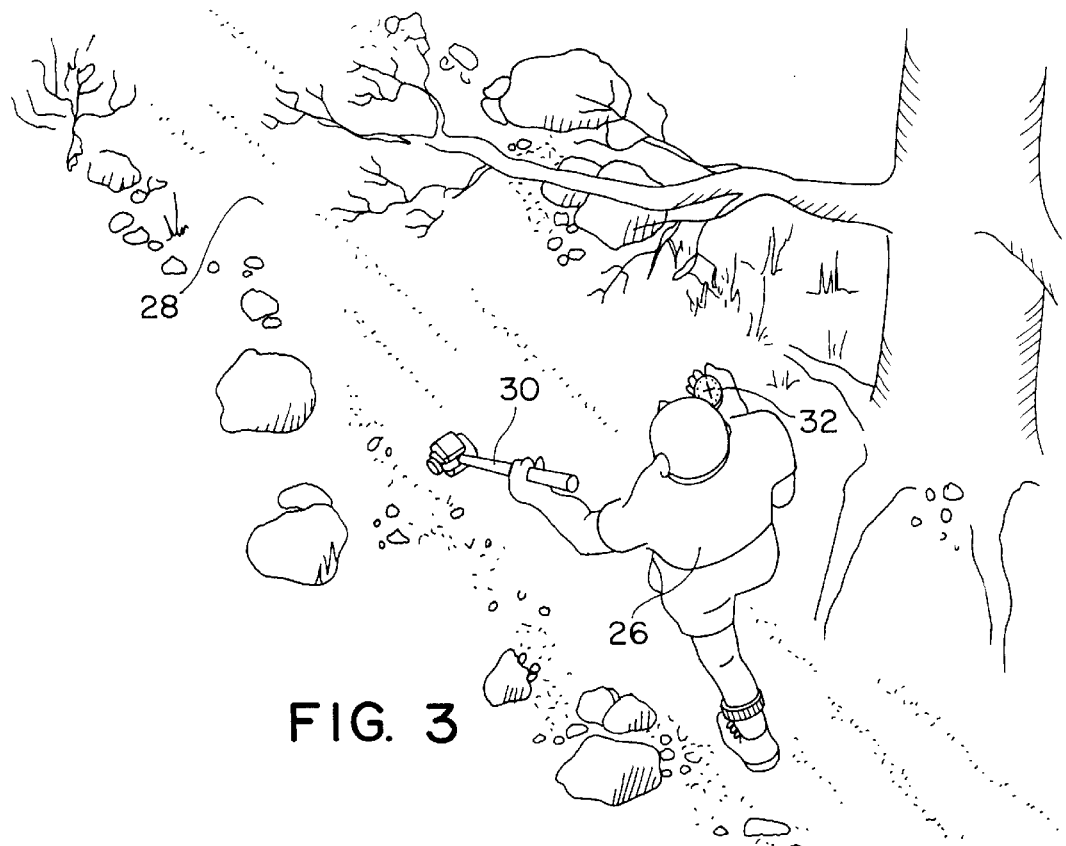
FIG. 3 is a perspective view illustrating a preferred technique for manually gathering data representative of the heading and distance of trail segments.
FIG. 4 is a chart such as may be utilized to record segment data according to a technique such as that shown in FIG. 3.

To provide accurate data regarding each of the trails to be mapped, the heading and distance of approximately linear segments of each such trail are preferably obtained manually. Referring now to FIG. 3, a preferred technique for manually obtaining this data is illustrated. Specifically, an individual 26 is shown walking a trail 28 to be mapped. As shown, individual 26 is in this case carrying a measuring wheel 30 and a directional compass 32. These devices are used to determine the distance and heading of each approximately linear segment of trail 28. This information may be recorded on an appropriate chart carried by individual 26, such as chart 34 illustrated in FIG. 4.

It should be appreciated that other instruments for obtaining similar information may also be utilized by individual 26. For example, individual 26 may carry a portable global positioning system ("GPS") receiver which gives position at the beginning and end of each approximately linear segment. To date, however, GPS receivers available on the commercial market have not provided positional information with sufficient accuracy for this purpose. In addition, most such receivers are not functional in deep forests or behind overhanging cliffs. Thus, the use of instruments such as described above is presently preferred, although the use of GPS technology may be preferred in the future.

Another aspect of field measurements on the ground as distinguished from plotting the trail from an aerial photograph is that in steep sections of a trail the slope can be measured and a trigonometric adjustment made to the measured distance. The horizontal component of this measurement can then be easily calculated and recorded for use as will be described below. This is accomplished by applying the cosine of the angle of the slope to the measured distance. Such a technique is generally not feasible using aerial photographs, except possibly if a stereo photo is made of the trail and the angles of the trail calculated from an estimation of the slope of the terrain.

Figure 5:
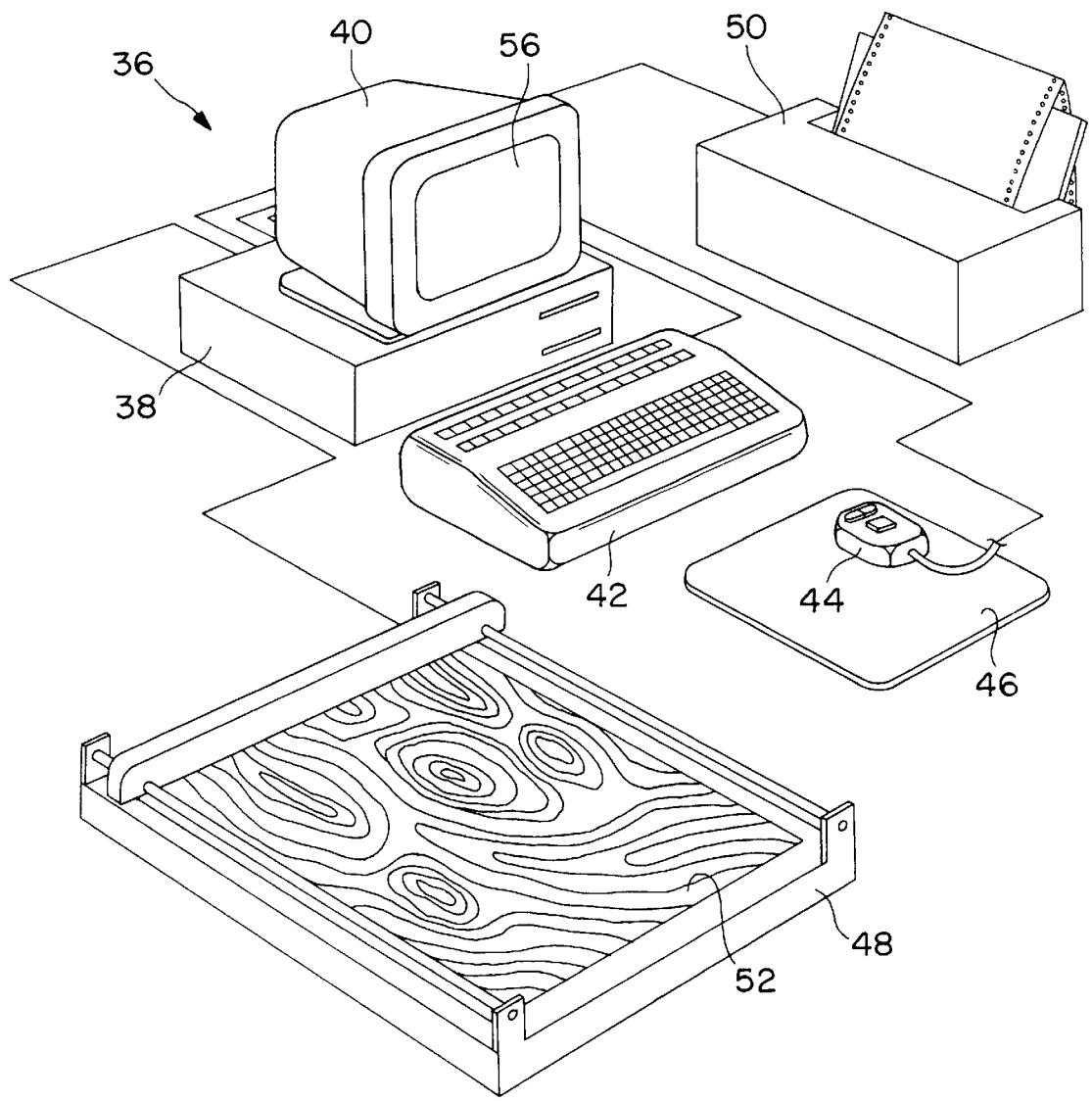
FIG. 5 is a computer system such as may be utilized to produce a trail map according to the present invention.

After the trail data is manually obtained, a trail map of the present invention may be produced utilizing a system such as that shown in FIG. 5. While a specially constructed system may certainly be utilized for this purpose, presently preferred embodiments are configured as a specially programmed personal computer with appropriate peripheral equipment. Specifically, such a personal computer (generally indicated at 36) includes a processor 38 and a display monitor 40. A keyboard 42 is also provided so that manually obtained trail data may be entered as necessary. A mouse 44, which may move about pad 46, is provided for reasons which will be explained more fully below. Further, system 36 includes a large format digital scanner 48 and a printer 50, preferably a color printer.

Figure 6:
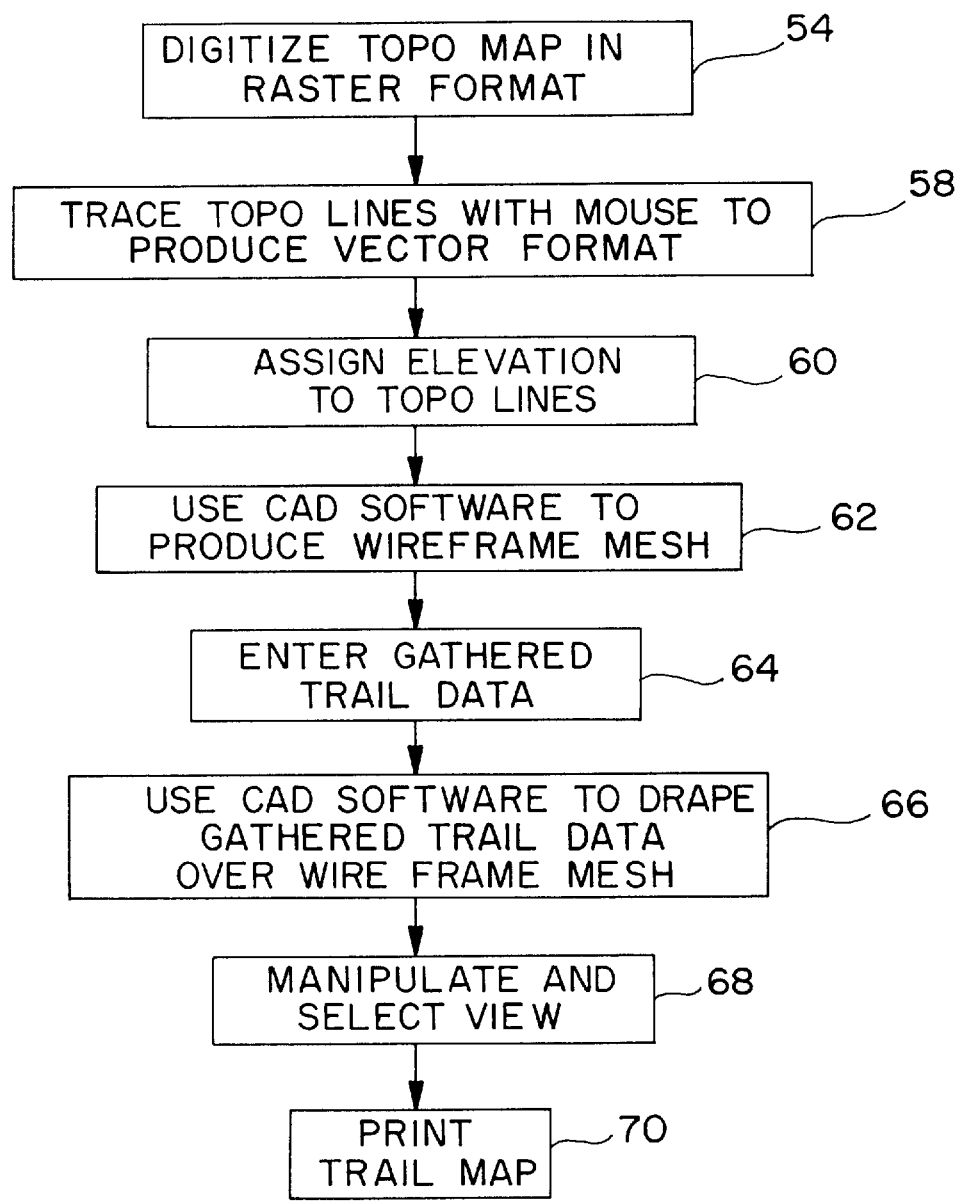
FIG. 6 is a flow chart illustrating various steps which may be utilized by the system of FIG. 5 to produce a trail map according to the present invention.

Referring now also to FIG. 6, the manner by which system 36 may be utilized to produce a trail map such as that shown in FIG. 2 may be most easily explained. First, a suitable topographical map 52 of the underlying geographical area is situated on scanner 48. A topographical map such as has been used as a basis for prior art trail maps may be utilized for this purpose.

As indicated at 54, an initial step involves digitizing map 52 into raster format utilizing scanner 48. An image of map 42 will then appear on the screen 56 of monitor 40. Next, the user of system 36 manipulates mouse 44 to carefully trace on screen 56 the individual topo lines of map 52, as indicated at 58. Utilizing CAD software, such as AUTOCAD, CAD OVERLAY GS, and QUICKSURF, the user assigns elevations to the topo lines, placing the formerly raster format image into vector format, as indicated at 60. It should be appreciated that, in some cases, suitable topographical maps may be available in electronic format. In such situations, some or all of the preceding steps may be advantageously eliminated.

Next, CAD software such as QUICKSURF and AUTOCAD may be utilized to create a wire frame mesh from the vector format image, as indicated at 62. As indicated at 64, the gathered trail data is then entered into processor 38 utilizing keyboard 42. Appropriate CAD software, such as AUTOCAD and QUICKSURF, may then be utilized to "drape" the gathered trail data over the wire frame mesh beginning with a selected benchmark. Next, as shown in step 68, AUTOCAD may be utilized to manipulate and select the desired view, which can be rendered by AUTOCAD Render software (AvRENDER bundled with AUTOCAD). The trail map may then be printed via printer 50, as shown at step 70.

It can thus be seen that the present invention provides a method and system for producing a map by which the relative difficulty of a hiking trail or other course of travel may be easily appreciated. One skilled in the art will appreciate that modifications and variations may be made to the present invention without departing from the spirit and scope thereof, which is more particularly set forth in the appended claims. In addition, it should be understood that aspects of the various embodiments and methods may be interchanged both in whole or in part. Furthermore, those of ordinary skill in the art will appreciate that the foregoing description is by way of example only, and is not intended to be limitative of the invention so further described in such appended claims.

What is claimed is:

1. A method of producing a hiking trail map, said method comprising the steps of:

(a) travelling alone each approximately linear segment of a selected hiking trail and recording information indicative of a heading and distance of each said approximately linear segment to generate manually-obtained first data, said information indicative of a heading and distance of each approximately linear segment being obtained according to one of the following:

(i) measuring said distance of each said approximately linear segment utilizing a manual distance measuring device and measuring said heading thereof utilizing a compass; and (ii) measuring a respective position of a beginning and an end of each said approximately linear segment utilizing a portable satellite receiver device and calculating said heading and distance therefrom;

(b) entering into a computer device second data indicative of a topography of a geographical area underlying said hiking trail as represented from plan and generating therefrom a vector format image;

(c) entering said first data into said computer device;

(d) correlating said first data and said second data to generate third data indicative of said approximately linear segments of said hiking trail as overlying said geographical area, said correlating step progressively correlating successive of said approximately linear segments beginning with a selected benchmark;

(e) selectively generating from said third data a representation of said hiking trail showing said linear segments situated at a relative angle with respect to adjacent segments, said relative angle representative of a slope and direction thereof, said representation being a perspective representation generated such that parallel features remain substantially parallel therein; and (f) printing said representation on a sheet-like substrate to produce said hiking trail map, whereby changes in elevation of said hiking trail are continuously shown on said hiking trail map to facilitate visual appreciation of the difficulty thereof by a hiker.

2. A method as set forth in claim 1, wherein step (b) comprises:

(g) providing a plan-view topographical map of said geographical area underlying said hiking trail;

(h) digitally scanning said plan-view topographical map of said geographical area into a raster format image;

(i) preserving topo lines on said raster format image; and (j) assigning relative elevations to respective of said topo lines to generate a vector format image.

3. A method as set forth in claim 2, wherein step (b) further comprises generating a wire frame mesh image from said vector format image and step (d) comprises draping said first data onto said wire frame mesh image to correlate it with said second data.

4. A method as set forth in claim 1, wherein said manual distance measuring device utilized to determine said distance of each said approximately linear segment of said hiking trail is a measuring wheel.

* * * * *

UNITED STATES PATENT AND TRADEMARK OFFICE
CERTIFICATE OF CORRECTION

PATENT NO. : 5,857,066
DATED : January 5, 1999
INVENTOR(S) : Wyche et al.

It is certified that error appears in the above-indentified patent and that said Letters Patent is hereby corrected as shown below:

In Column 6, Line 51, please change "alone" to ---along---

Signed and Sealed this

Sixth Day of April, 1999

Attest:

Q. TODD DICKINSON

*Attesting Officer*          *Acting Commissioner of Patents and Trademarks*